(12) United States Patent
Brockhoff et al.

(10) Patent No.: US 9,045,173 B2
(45) Date of Patent: Jun. 2, 2015

(54) FRONT-END STRUCTURE OF A MOTOR VEHICLE

(71) Applicant: Benteler Automobiltechnik GmbH, Paderborn (DE)

(72) Inventors: Franz Ulrich Brockhoff, Bramsche (DE); Stefan Grottke, Rheine (DE); Stefan Schmitz, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/169,947

(22) Filed: Jan. 31, 2014

(65) Prior Publication Data

US 2014/0216839 A1    Aug. 7, 2014

(30) Foreign Application Priority Data

Feb. 4, 2013    (DE) .......................... 10 2013 101 085

(51) Int. Cl.
*B60R 19/02* (2006.01)
*B62D 21/15* (2006.01)

(52) U.S. Cl.
CPC ............ *B62D 21/155* (2013.01); *B62D 21/152* (2013.01)

(58) Field of Classification Search
CPC .... B62D 21/155; B62D 21/152; B60R 19/16; B60R 19/18
USPC ........ 180/232, 274, 311; 296/187.09, 193.09, 296/203.02, 204, 205; 280/124.109, 781, 280/784, 785; 293/102, 132, 133
See application file for complete search history.

(56) References Cited

U.S. PATENT DOCUMENTS

| | | | | |
|---|---|---|---|---|
| 3,869,017 | A  * | 3/1975 | Feustel et al. ................. | 180/232 |
| 7,219,954 | B2 * | 5/2007 | Gomi et al. .............. | 296/203.02 |
| 7,954,884 | B2 * | 6/2011 | Kosaka .................... | 296/187.09 |
| 2005/0067860 | A1 | 3/2005 | Makita et al. | |
| 2009/0102236 | A1* | 4/2009 | List et al. ................ | 296/187.09 |
| 2009/0261620 | A1* | 10/2009 | Dandekar et al. ........ | 296/187.09 |
| 2011/0133512 | A1* | 6/2011 | Mildner et al. .......... | 296/187.09 |
| 2012/0007373 | A1* | 1/2012 | Boettcher et al. ............ | 293/132 |
| 2012/0175900 | A1* | 7/2012 | Rawlinson .................... | 293/132 |
| 2012/0248820 | A1* | 10/2012 | Yasui et al. ............. | 296/187.09 |
| 2012/0313398 | A1 | 12/2012 | Shin et al. | |

FOREIGN PATENT DOCUMENTS

| | | |
|---|---|---|
| DE | 100 32 710 | 1/2002 |
| DE | 101 13 098 | 9/2002 |
| EP | 1 332 949 | 8/2003 |

OTHER PUBLICATIONS

International Search Report issued by the European Patent Office in International Application PCT/.

* cited by examiner

*Primary Examiner* — Paul N Dickson
*Assistant Examiner* — Darlene P Condra
(74) *Attorney, Agent, or Firm* — Henry M. Feiereisen LLC

(57) ABSTRACT

A front-end structure of a motor vehicle includes a transverse member and two crash boxes. In addition a transverse reinforcement member is arranged according to the invention, wherein the transverse reinforcement member is supported via coupling beams on a subframe.

11 Claims, 5 Drawing Sheets

FRONT-END STRUCTURE OF A MOTOR VEHICLE

CROSS-REFERENCES TO RELATED APPLICATIONS

This application claims the priority of German Patent Application, Serial No. 10 2013 101 085.7, filed Feb. 4, 2013, pursuant to 35 U.S.C. 119(a)-(d), the disclosure of which is incorporated herein by reference.

BACKGROUND OF THE INVENTION

The present invention relates to a front-end structure of a motor vehicle.

The following discussion of related art is provided to assist the reader in understanding the advantages of the invention, and is not to be construed as an admission that this related art is prior art to this invention.

During operation, motor vehicles are often exposed to dangers, in particular in the form of collisions. In this case it is possible that motor vehicles collide with other motor vehicles or that a motor vehicle drives onto an obstacle or another fixed item.

For this purpose, crash systems have been developed which are intended to realize two fundamental principles. On one hand the crash system is supposed to protect the occupants of a motor vehicle from the forces acting as a result of the impact and accelerations as best as possible. Thus, a crash system may be configured in order to convert kinetic energy into deformation energy for example by way of a crash box so as to mitigate the impact acceleration acting on the occupants as best as possible.

A further object of the crash system is however to absorb or conduct the damage and deformation caused at the motor vehicle by the accident or the impact in a targeted manner, in particular when only low speeds are involved, so that costs of reconstruction or repair of the motor vehicle can be kept low.

The most common crash structure of a motor vehicle known to date is configured so that a transverse member is arranged on the front on the motor vehicle, and is fixed on the motor vehicle by crash boxes which become deformed in the case of an impact. Mostly, the crash boxes are mounted as an extension of the longitudinal member of the motor vehicle. When a motor vehicle drives onto a fixed obstacle or collides with another vehicle, the bending-stiff transverse member absorbs the force and transmits it to the crash boxes. The crash boxes themselves become deformed for example through the formation of folds, and thus convert a portion of the impact energy into deformation energy.

In a partially overlapping frontal collision, in particular in the case of a partially overlapping frontal collision with less than 25% overlap, however, the problem arises that the impact energy absorbed by the transverse member is not introduced into the longitudinal member via the crash box in a manner that the impact energy can be absorbed. Rather there is the danger that an excessively strong lateral impact will cause the longitudinal member to bend away in the transverse direction of the vehicle thus rendering the crash box incapable of converting the impact energy into deformation energy in the first place.

From the state of the art, a kinematic coupling of the front wheels of the motor vehicle is known through DE 100 32 710 A1 or DE 101 13 098 A1 in which the front wheel of the motor vehicle in case of a crash is respectively pivoted in toe-in position in order to cause the obstacle to laterally slide off relative to the motor vehicle. However, this requires a complex kinematic coupling and limits the design freedom of the wheel suspension.

From EP 1 322 949 A2 a front wheel frame structure for a motor vehicle is further known in which the longitudinal member and the crash boxes do not substantially extend in longitudinal direction of the motor vehicle but are angled at their front ends relative to the longitudinal direction of the vehicle. In addition a subframe is provided which provides the front-end structure with stiffness. Such a system however, adversely affects the crash performance of the motor vehicle in case of a frontal crash, which is more likely during operation of the motor vehicle.

It would therefore be desirable and advantageous to provide a possibility to significantly improve the crash performance of a motor vehicle for a frontal collision with partial overlap without affecting the constructive freedom of the front-end structure and the wheel suspension of the motor vehicle.

SUMMARY OF THE INVENTION

According to one aspect of the present invention, a front-end structure of a motor vehicle includes longitudinal members, a transverse member coupled to ends of the longitudinal members, crash boxes arranged between the transverse member and the longitudinal member, wherein the transverse member conducts impact energy generated by a frontal crash into the crash boxes, a subframe arranged underneath the front-end structure, and a transverse reinforcement member arranged in relation to a longitudinal direction of the motor vehicle in front of front wheels of the motor vehicle, wherein the transverse reinforcement member essentially extends over a width of the motor vehicle and covering both front wheels; and first coupling beams supporting the transverse reinforcement member on the subframe.

The subframe itself is in particular the axle subframe of the front axle of the motor vehicle. The transverse reinforcement member is positioned in z-direction of the motor vehicle below and in front of the centers of the front wheels in relation to the motor vehicle coordinate system. In a motor vehicle with a front mounted engine, the transverse reinforcement member is in particular positioned relative to the longitudinal direction of the vehicle so as to be arranged behind a motor vehicle heat exchanger, i.e., behind a cooler and again relative to the longitudinal direction of the vehicle in front of the oil pan of the combustion engine.

When the motor vehicle now suffers a frontal collision with an overlap of smaller than 25%, the transverse reinforcement member absorbs the impacting object or the impacting vehicle and supports the object on the subframe via the coupling beam. As a result of the transverse reinforcement member the object or the vehicle is thus deflected laterally relative to the transverse direction of the vehicle and does not at least partially enter into the region of the front wheel. As a result of the partial overlap of each front wheel relative to the transverse direction of the vehicle, it is further possible that due to a deformation of the coupling beam the transverse reinforcement member is pushed as far as to the front wheel in case of an impact with high intensity, and subsequently supports itself on the front wheel. This also ensures that an impacting object is then laterally deflected from the motor vehicle and does not enter the region of the front wheel to a critical degree so as to cause strong deformations of the remaining frame structure of the motor vehicle, which might result in the requirement for significant repairs.

The front-end structure is thus in particular characterized in that its construction requires a low amount of material and its components can be manufactured cost effectively, however at the same time significantly increases crash performance of the motor vehicle, in particular in impact scenarios with less than 25% partial overlap. Thus, as a result of the transverse reinforcement member, in case of a crash with little overlap, a part of the crash energy is further conducted to the floor assembly by the subframe and by the front wheel. This results in a particularly advantageous support on the vehicle body especially with regard to the passenger compartment, which only suffers minor deformation when the crash energy is further conducted to the floor assembly.

The front-end structure according to the invention is further characterized in that it can be integrated in already existing front-end structures of a motor vehicle and only negligibly affects the constructive freedom of the front axle system and/or packaging of the front-end structure. For this, the transverse reinforcement member is in particular arranged between a cooler which is arranged front-side in longitudinal direction of the motor vehicle, and a motor disposed behind the cooler, wherein the transverse reinforcement member relative to the vertical axis of the motor vehicle is arranged substantially at the height of or below the center of the front wheels and in longitudinal direction of the motor vehicle between the cooler and an oil pan of the motor. In an impact scenario with medium intensity, the motor vehicle cooler, which is arranged behind the transverse member, would at least be partially damaged, wherein a further effect of the impacting object onto the motor, which lies behind the transverse reinforcement member, and in particular an impact onto the oil pan, is avoided. The repair costs in an accident scenario with medium intensity can thus be limited essentially to easily mountable replacement parts and no frame repair work has to be carried out or new welded plates have to be used. Also damage to the combustion engine is avoided to the greatest degree. In an impact scenario with high intensity, i.e., with strong damage to the entire frontward structure of the vehicle due to the intensity of the impact, the impacting object is at the same time deflected sideways in a targeted manner, in order to avoid further damage to the interior space, in particular the interior space for the vehicle occupants.

According to another advantageous feature of the invention, the subframe can be constructed as an axle subframe of the front axle, wherein the coupling beams are guided past the front wheels relative to the transverse direction of the motor vehicle, and are arranged so as to extend from the axle subframe to the transverse reinforcement member. This makes it in particular possible to guide the coupling beams in the region of the floor assembly of the motor vehicle so that again the packaging and the constructive freedom for the axle kinematics of the front axle and also for the arrangement of the main crash management system and the motor components and the periphery components are not influenced. In the case of damage to the transverse reinforcement member it is possible to demount the transverse reinforcement member, owing to a user-friendly accessibility, and to mount a new replacement or exchange system.

According to another advantageous feature of the invention, the coupling beams are configured so as to have a straight extent between the subframe and the transverse reinforcement member and are arranged so as to extend at an angle relative to the longitudinal axis of the motor vehicle between 5 and 35°, in particular between 6 and 30° and preferably between 8 and 25°, particularly preferably between 10 and 20°. This makes it possible on one hand to absorb an impact with medium intensity in a particularly stable manner by means of the transverse reinforcement member. In case of an impact with high intensity, the angled arrangement relative to the longitudinal axis of the motor vehicle ensures that the impacting object or the impacting vehicle is guided laterally away from or past the own motor vehicle.

According to another advantageous feature of the invention, the transverse reinforcement member may be optionally additionally supported laterally on a respective longitudinal member with a further coupling beam. Within the scope of the invention a coupling beam is thus arranged in the longitudinal member, which coupling beam then is oriented so as to extend obliquely downward and outward relative to the transverse reinforcement member and is coupled with the transverse reinforcement member. This additionally ensures a stable support of the transverse reinforcement member and in addition that an impacting obstacle or an impacting vehicle is laterally guided past the own vehicle.

According to another advantageous feature of the invention, it is also possible as an alternative or in addition that the transverse reinforcement member is additionally supported with a coupling beam on the fender carrier. Within the scope of the invention a fender carrier is formed in the frontward structure of the vehicle in the region above each front wheel, on which fender carrier the visible outer fender of the motor vehicle is supported. In addition or as an alternative to the support on the longitudinal member, it is possible within the scope of the invention to extend the fender carrier and to guide the fender carrier up to the transverse reinforcement member. The transverse reinforcement member is then coupled with the fender carrier.

According to another advantageous feature of the invention, the coupling beam of the fender carrier can be adapted to the contour of the front wheel so as to conform to at least a circumferential section of the front wheel. In case of an impact with an intensity so that the transverse reinforcement member with its coupling beams is deformed, it is possible that the coupling beam of the fender carrier is supported on the front wheel. In particular the support is such that the coupling beam of the fender carrier rests circumferentially against at least sections of the circumference of the motor vehicle wheel.

Further, in addition or as an alternative to the above mentioned additional support possibilities it is possible to couple the transverse reinforcement members with a support beam, wherein the support beam is fixed on the longitudinal member and/or the motor bearing and is coupled by a tip of the support beam with a further coupling rod with the transverse reinforcement member. Particularly preferably the support beam is hereby coupled with the longitudinal member so that the support beam is integrated at a front end of the longitudinal member between the longitudinal member and the crash box and the support beam is further configured as pressure rod.

According to another advantageous feature of the invention, all aforementioned components, in particular the transverse reinforcement member itself, can be made from a metallic material, in particular from a steel material or from a lightweight metal, in particular aluminum. As alternative thereto it is also provided however within the scope of the invention that the transverse reinforcement member is made of a fiber composite material. Within the scope of the invention it is in particular possible to integrate a reinforcement patch on the longitudinal member and/or on the transverse member and/or on the transverse reinforcement member, in order to better absorb the forces which are in particular transmitted by the support beams in the case of a crash. The reinforcement patch in particular avoids that a support beam in the form of a pressure rod for example enters into the longitudinal member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
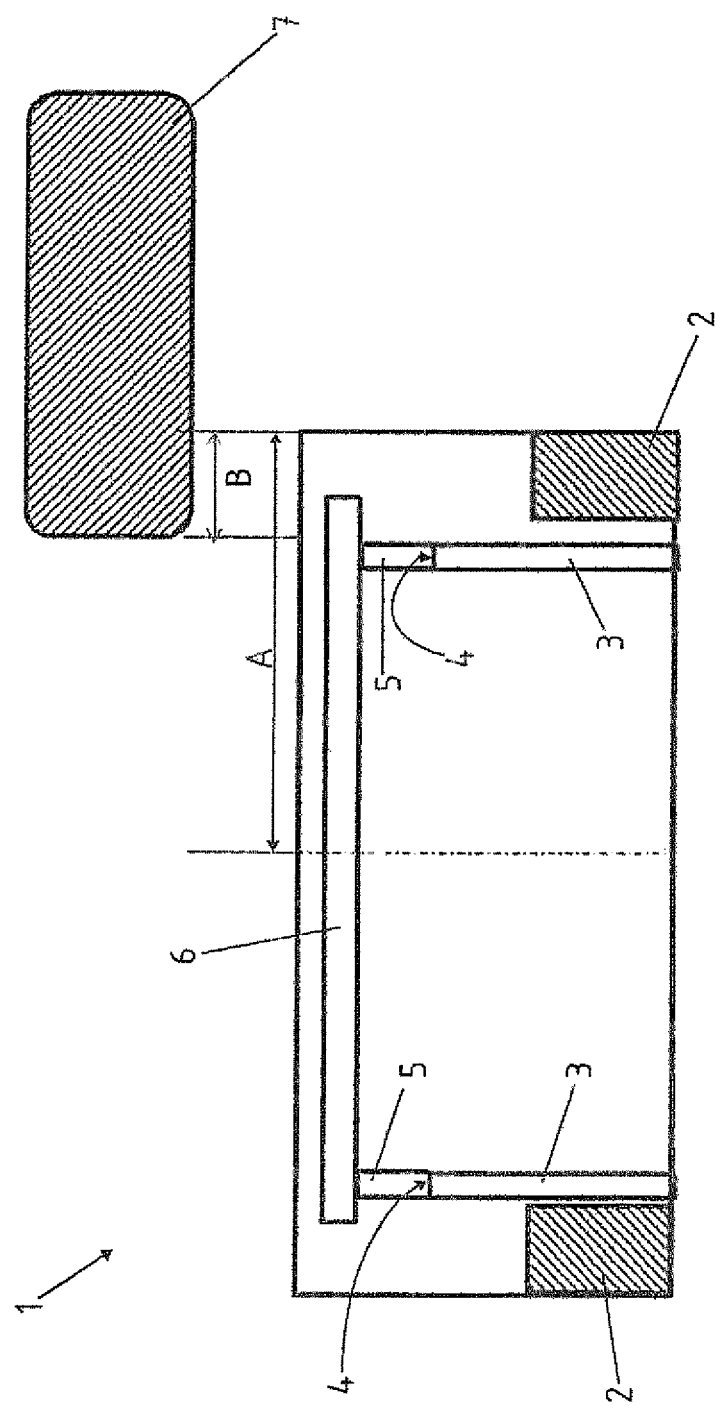
FIG. 1 shows a crash management system known from the state of the art.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a front-end structure 1 of a not further shown motor vehicle known from the state-of-the-art, having two front wheels 2 and longitudinal members 3 of the not further shown vehicle body, which protrude over the front wheels 2. A respective crash box 5 is arranged on each of the front ends 4 of the longitudinal members 3, wherein again a transverse member 6 may be coupled with the crash box 5. In the case of a collision the occurring impact energy is introduced into the crash boxes 5 via the transverse member 6 where it is absorbed at least in part by way of deformation of the crash boxes 5. When now a collision with an obstacle 7 with lateral partial overlap A in particular with a partial overlap B of 25% or less occurs, the obstacle 7 is only insufficiently impacted by the transverse member 6 or no longer impacted at all. The obstacle 7 would thus enter into the front wheel 2 and may cause damage to the side of the longitudinal member 3 and thereby enter into the passenger compartment, in particular the foot space of the passenger compartment.

Figure 2:
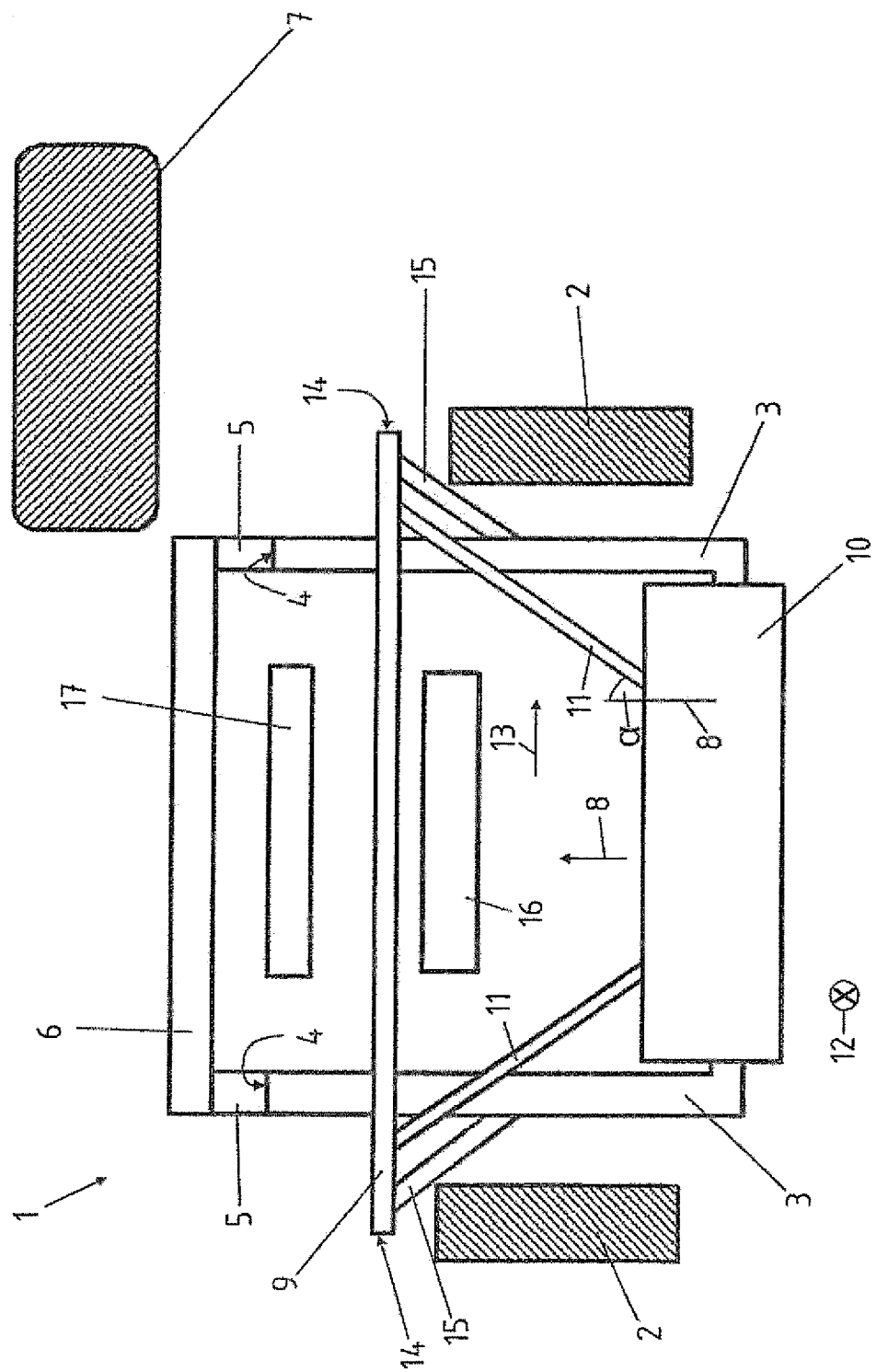
FIG. 2 shows the front-end structure according to the invention with transverse reinforcement member in a top view.

FIG. 2 shows the idea of the present invention in a view from below. The embodiment according to the invention according to FIG. 2 again has two front wheels 2 and two longitudinal members 3, wherein a respective crash box 5 is coupled on the front ends 4 of the longitudinal members 3 and opposite the crash box 5 a transverse member 6 is again arranged in front of the crash box in longitudinal direction 8 of the vehicle. According to the invention in this case a transverse reinforcement member 9 is additionally integrated which is supported on a subframe 10, in particular an axle subframe via a coupling beam 11. The transverse reinforcement member 9 is arranged underneath the motor vehicle relative to the vertical axis of the motor vehicle 12, which extends into the image plane. The coupling beam 11 thus extends in the region of the floor assembly of the motor vehicle. In motor vehicle transverse direction 13 the ends 14 of the transverse reinforcement member 9 cover the respective front wheels 2 at least partially so that an impacting obstacle 7 or a not further shown impacting other motor vehicle can be laterally deflected from the own motor vehicle. The coupling beams 11 extend in particular at an angle α between 5 and 35° in relation to the motor vehicle longitudinal direction 8 so that a sufficient support force is given in motor vehicle longitudinal direction 8 and at the same time in case of the impact a lateral sliding off is ensured. Optionally, the transverse reinforcement member 9 is additionally laterally supported on the longitudinal member 3 via an additional coupling beam 15. This increases the capacity to laterally deflect an obstacle 7, but also further increases the resilience in the case of a vehicle crash or when impacting an obstacle 7. According to the invention, the transverse reinforcement member 9 is further arranged so that it is disposed in front of the oil pan 16 and behind a cooler 17 in the lower foot region of the motor vehicle relative to the motor vehicle longitudinal direction 8.

Figure 3:
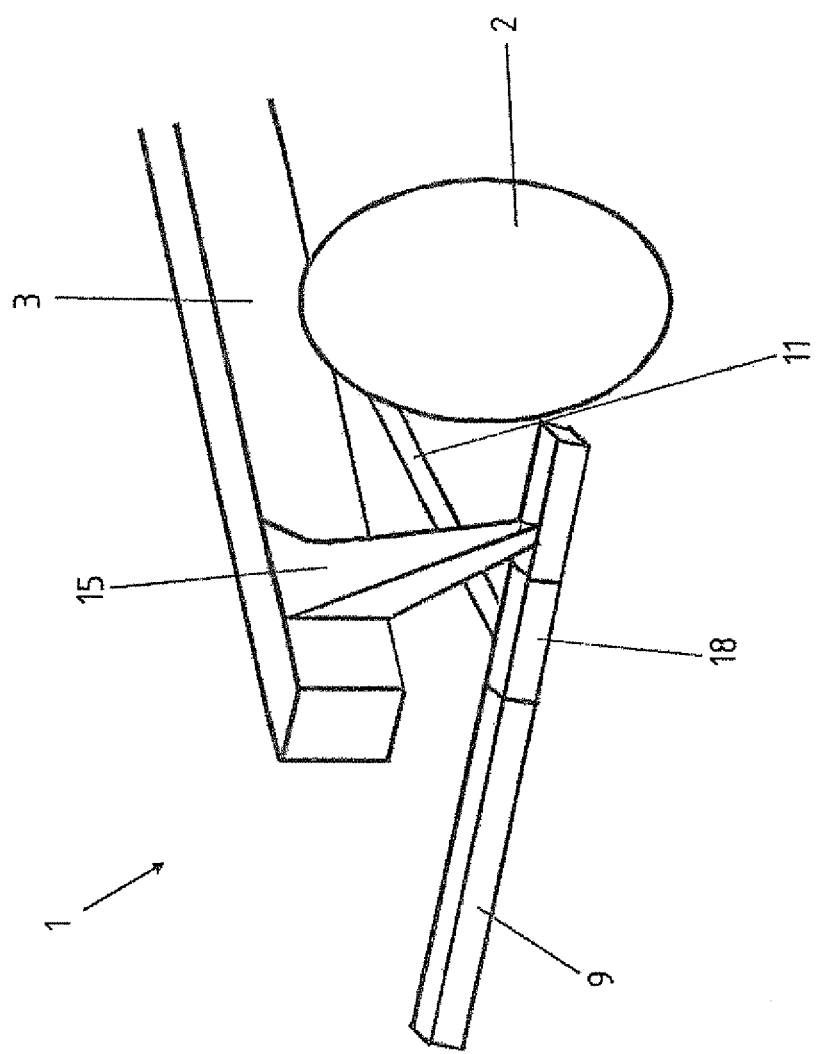
FIG. 3 shows the front-end structure according to the invention with transverse reinforcement member in a perspective side view with support against the longitudinal member.

FIG. 3 shows a front-end structure 1 according to the invention in a perspective side view having also a longitudinal member 3 and a transverse reinforcement member 9, which is supported on the not further shown subframe with a coupling beam 11. Also shown is the lateral support on the longitudinal member 3 via a coupling beam 15. For further increasing crash performance the coupling beam 11 to the subframe is coupled in the region of the transverse reinforcement member 9 with a reinforcement patch 18 so that a tearing off or bending-in of the transverse reinforcement member 9 does initially not occur, which allows the material of the transverse reinforcement member 9 in particular in the center region, to be configured thinner and with this weight effectively. The reinforcement patch 18 provides nevertheless a sufficient stiffness to the transverse reinforcement member 9 in order to be able to let an impacting obstacle slide off laterally on the motor vehicle. In particular in the case of metallic components sheet thicknesses between 0.5 and 2.5 mm, preferably in the range from 1 to 2 mm are used.

Figure 4:
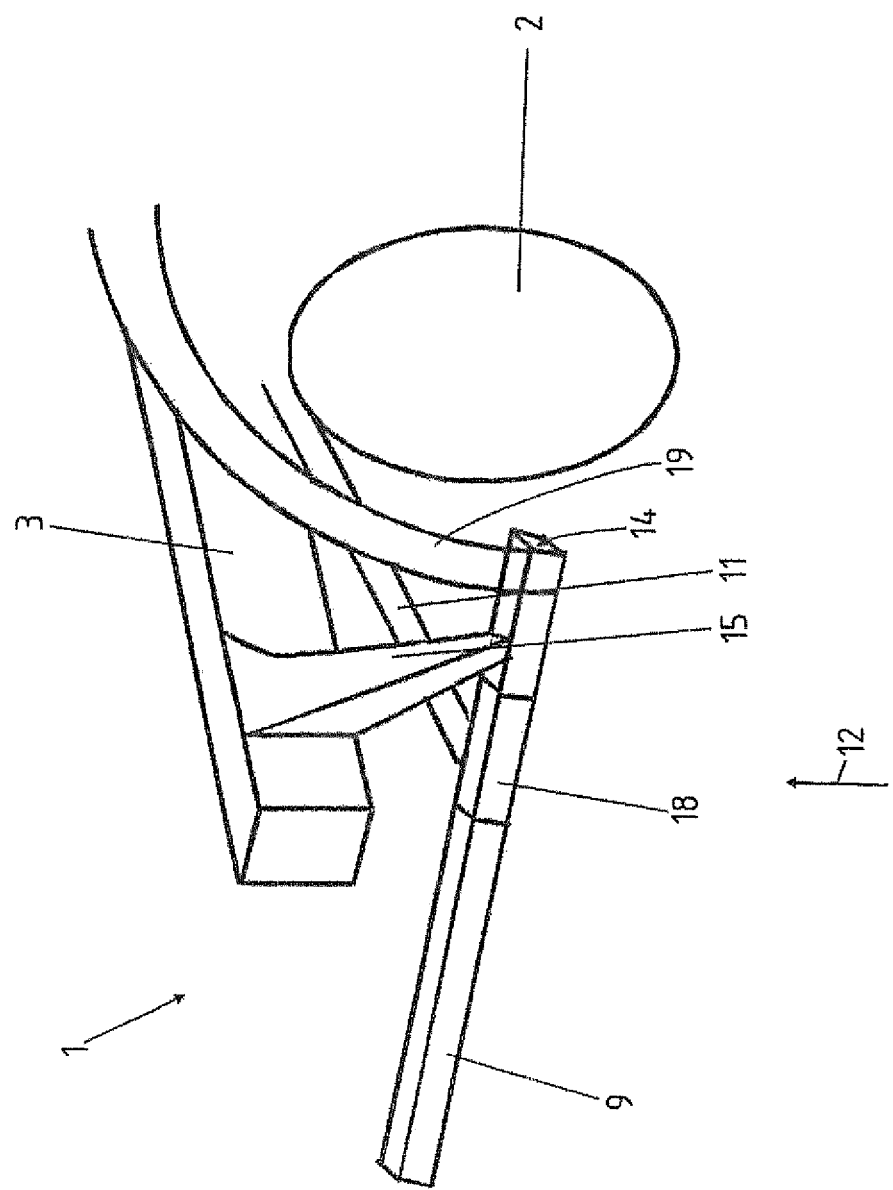
FIG. 4 shows the front-end structure of FIG. 3 with additional support against the fender carrier.

FIG. 4 shows an additional support via a coupling beam 19 of a fender carrier. The fender carrier is arranged, relative to the vertical axis of the motor vehicle 12, above the front wheel 2 and surrounds at least sections of the outer circumference of the front wheel 2. The coupling beam of the fender carrier 19 is arranged in particular in the region of the end 14 of the transverse reinforcement member 9.

Figure 5:
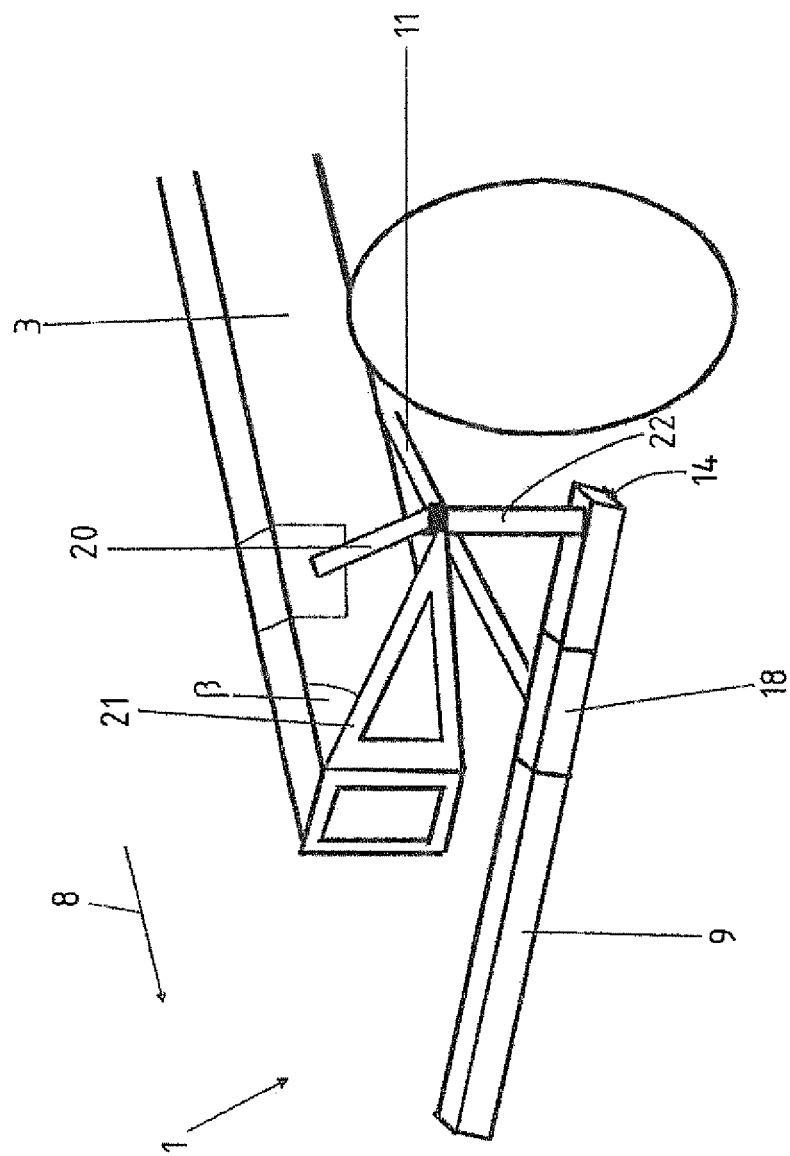
FIG. 5 shows the front-end structure according to the invention with alternative configuration of a support beam.

FIG. 5 shows an alternative support possibility thereto, wherein a support beam 20 is selected which on one hand, relative to the longitudinal direction 8 of the motor vehicle, is supported on a motor bearing or longitudinal member and in the front region between longitudinal member 3 and not further shown crash box a further support beam 21 is integrated. The support beam is arranged at an angle β between 30 and 90° relative to the longitudinal member 3. From these support beams 20/21 a further coupling beam 22 extends up to the end 14 of the transverse reinforcement member. Further, as already shown in FIG. 3, the coupling beam 11 to the not further shown subframe is arranged with a reinforcement patch 18 on the transverse reinforcement member. In addition, a reinforcement patch 23 is preferably arranged between the longitudinal member 3 and the support beam 20. The region on the longitudinal member 3 can however also be partially tempered. Within the scope of the invention, the longitudinal member 3 can also be reinforced by a partition wall arranged in the longitudinal member. The partition wall is then preferably oriented parallel to the Y-axis of the motor vehicle or parallel to the direction of the support beam 20. Within the scope of the invention it is also possible to arrange the partition wall so that it extends in the longitudinal member in a direction, which extends between the support beam 20 and the Y-axis of the motor vehicle, i.e., the transverse direction 13 of the motor vehicle.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A front-end structure of a motor vehicle, comprising:
   longitudinal members;
   a transverse member coupled to ends of the longitudinal members;
   crash boxes arranged between the transverse member and the longitudinal member, said transverse member conducting impact energy generated by a frontal crash into the crash boxes;
   a subframe arranged underneath the front-end structure; and a transverse reinforcement member arranged in relation to a longitudinal direction of the motor vehicle in front of front wheels of the motor vehicle, said transverse reinforcement member essentially extending over a width of the motor vehicle and covering both front wheels;
   first coupling beams supporting the transverse reinforcement member on the subframe; and
   a cooler and a motor arranged in a region of the front-end structure, wherein the transverse reinforcement member, in relation to a vertical axis of the motor vehicle is arranged essentially at a height of or below a center of the front wheels, and in relation to the longitudinal direction of the motor vehicle is arranged between the cooler and an oil pan of the motor.

2. The front-end structure of claim 1, wherein the subframe is constructed as an axle subframe of a front axle of the motor vehicle, and wherein the first coupling beams are arranged on an inward facing side of the front wheels and extend from the axle subframe to the transverse reinforcement member.

3. The front-end structure of claim 1, wherein the first coupling beams have a straight extent and in relation to the longitudinal axis of the motor vehicle extend at an angle between 5 and 35 degrees.

4. The front-end structure of claim 3, wherein the first coupling beams extend in relation to the longitudinal axis of the motor vehicle at an angle between 6 and 30 degrees.

5. The front-end structure of claim 3, wherein the first coupling beams extend in relation to the longitudinal axis of the motor vehicle at an angle between 8 and 25 degrees.

6. The front-end structure of claim 3, wherein the first coupling beams extend in relation to the longitudinal axis of the motor vehicle at an angle between 10 and 20 degrees.

7. The front-end structure of claim 1, further comprising a second coupling beam, wherein the transverse reinforcement member is additionally laterally supported on the longitudinal member with the second coupling beam.

8. The front-end structure of claim 1, further comprising a fender carrier and a third coupling beam, wherein the transverse reinforcement member is additionally supported on the fender carrier with the third coupling beam.

9. The front-end structure of claim 8, wherein the third coupling beam of the fender carrier is shaped to conform to at least a region of a circumferential contour of the front wheel.

10. The front-end structure of claim 1, further comprising a support beam fixed on the longitudinal member and/or a motor bearing, and a fourth coupling beam, said support beam having a tip and being coupled by the tip with the fourth coupling beam on the transverse reinforcement member, wherein the transverse reinforcement member is additionally coupled with the support beam.

11. The front-end structure of claim 1, wherein the transverse reinforcement member is made of a metallic material or of a fiber composite material.

* * * * *